(No Model.)

P. N. BROOKS.
OIL FILTER.

No. 543,797. Patented July 30, 1895.

WITNESSES:
W. Hermann Apgar.
K. M. Gilligan

INVENTOR
Peter N. Brooks
BY
Augustus B. Stoughton
ATTORNEY

UNITED STATES PATENT OFFICE.

PETER N. BROOKS, OF PHILADELPHIA, PENNSYLVANIA, ASSIGNOR OF ONE-HALF TO P. S. CASSIDY, OF SAME PLACE.

OIL-FILTER.

SPECIFICATION forming part of Letters Patent No. 543,797, dated July 30, 1895.

Application filed August 17, 1894. Serial No. 520,555. (No model.)

*To all whom it may concern:*

Be it known that I, PETER N. BROOKS, a citizen of the United States, residing at the city of Philadelphia, in the county of Philadelphia and State of Pennsylvania, have invented certain new and useful Improvements in Oil-Filters, of which the following is a specification.

The principal object of my present invention is to provide a simple, durable, self-contained, and comparatively-inexpensive device or apparatus for expeditiously and efficiently filtering new as well as waste oil, and to construct, arrange, and combine the various parts of the apparatus in such a manner that the filtering material may be cleaned at any time and without removing it and without drawing off the filtered oil.

My invention consists in the improvements hereinafter described and pointed out in the claims, and its nature, characteristic features, and scope will be more fully understood from the following description, taken in connection with the accompanying drawings, forming part hereof, and in which is illustrated, in—

Figure 1:
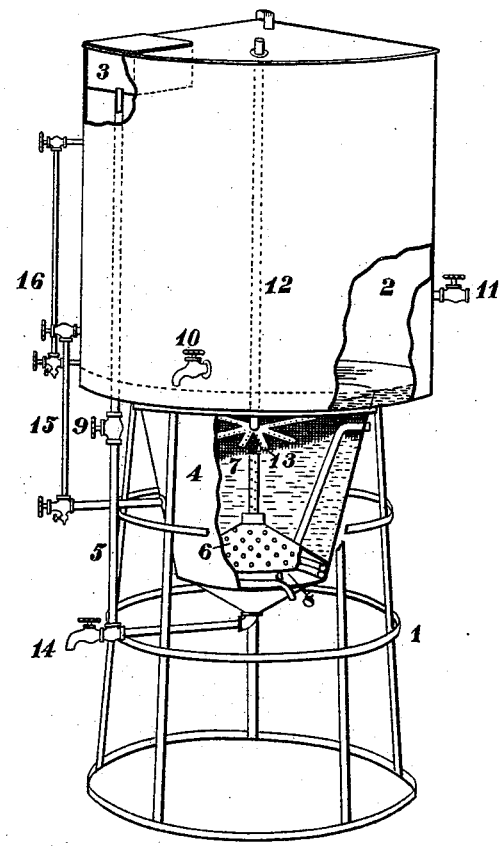
Figure 2:
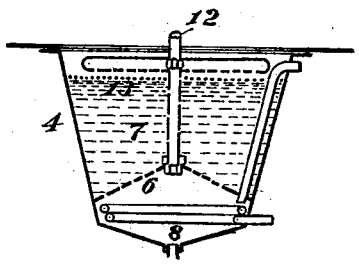

Figure 1, partly in section and partly in elevation, an oil-filter embodying features of my invention, and in Fig. 2 details of construction.

In the drawings, 1 is a base or stand for supporting the entire or complete apparatus.

2 is a reservoir or tank for the purified or filtered oil. This tank or reservoir 2 is provided internally with a receptacle 3 for the oil to be filtered, and with a depending filtering-vessel 4, whose interior communicates with the interior of the reservoir or tank 2. This filtering vessel or chamber 4 is of less diameter than the tank or reservoir 2 in order to fit into the stand 1, and communicates at its base by way of a pipe 5, passing through the interior of the reservoir or tank 2, with the receptacle 3. This vessel or chamber 4 contains filtering material, as cork shavings, which are retained therein by means of a perforated cap 6, overlying the end of the pipe 5, and by means of a gauze or wire netting 7, located between the chamber or vessel 4 and the reservoir or tank 2.

8 is a steam or hot-water coil located under the cap 6, and adapted to heat the fluid supplied to the filtering material.

9 is a hand-valve applied to the portion of the pipe 5 that lies without the filtering chamber or vessel and that is adapted to control the flow of oil from the receptacle 3 to the filtering-vessel 4, in order to permit the oil to remain in the former long enough to allow the grosser impurities to settle therein.

10 is a spigot or hand-valve by means of which purified oil may be drawn from the reservoir or tank 2 into oil-cans or other vessels for use, and 11 is a valve by means of which purified oil may be led through pipes (not shown) to any point for use.

12 is a water-induction pipe resting upon or mounted above the cap 6 and extending through and out of the top of the reservoir or tank 2, in order to permit of the application of a hose or other source of supply to its upper end. This pipe 12 is perforated at its lower portion so as to discharge water radially through the filtering material, and is provided with perforated arms 13, overlying the filtering material and discharging downward upon it.

14 is a spigot by means of which water and impurities may be permitted to escape from the filtering-vessel 4.

15 is a sight-gage and connections by means of which the height of water in the vessel or chamber 4 and tank or reservoir 2 may be ascertained, and in this connection it should be stated that water should fill the vessel 2 to about the level indicated by the dotted line.

16 is a sight-gage and connections by means of which the height of the supernatant and purified oil in the tank or reservoir 2 may be ascertained.

In use water is introduced by means of the pipe 12, or otherwise into the chamber or vessel 4 and reservoir or tank 2 until it reaches about the level indicated by the dotted line. Either new or waste oil to be filtered is introduced into the receptacle 3 and its escape therefrom may be retarded by means of the valve 9, in order to permit grosser impurities to settle in the receptacle 3. From the receptacle 3 oil passes by way of the pipe 5 and is heated by the coils of pipe 8 and is then discharged beneath the cap 6, through the perforations of which it escapes into the vessel or chamber 4, and the heated oil rises through the filtering material and through water contained in the vessel 4 and tank 2, whereby it becomes purified and then floats upon the surface of the water in the tank or reservoir 2, from which it is drawn off by the spigot 10 or valve 11 for use. Whenever it becomes necessary or desirable to clean or wash the filtering material this result may be readily accomplished by permitting water to escape from the pipes 12 and 13, through the filtering material and away from the apparatus by way of the spigot 14, it being understood that the valve 9 is closed during this operation, although the purified oil remains supernatant and need not be drawn off from the reservoir or tank 2 during the time that the filtering material is being cleansed by jets of water issuing from the pipes 12 and 13, as has been already described.

Having thus described the nature and objects of my invention, what I claim as new, and desire to secure by Letters Patent, is—

1. The combination in an oil filter, with an oil reservoir provided with an outlet connection as 11, and with a depending filter chamber having filtering material fixed therein and having an opening at its bottom and a pipe applied to said opening for introducing oil and for discharging water, of, a perforated cap mounted over said opening, and perforated water pipes supported on said cap and embedded in and overlying said filtering material for flooding said chamber to float the supernatant oil in the reservoir and for introducing jets through and upon the filtering material, substantially as described.

2. The combination in an oil filter with, a filter chamber depending from an oil reservoir and having filtering material fixed therein and having an opening at its bottom for introducing oil and for discharging water, of a perforated cap mounted over said opening, and perforated water pipes supported on said cap and embedded in and overlying said filtering material for flooding said chamber to float the supernatant oil in the reservoir and for introducing jets radially through and upon the filtering material, substantially as described.

3. The combination in an oil filter with, a filter chamber depending from and communicating with an oil reservoir, of a pipe leading from an oil receptacle and opening into said chamber and provided with an oil valve and with a spigot, a perforated cap and a gauze netting and interposed filtering material mounted in said chamber and above the open end of said pipe, a radially perforated water induction pipe resting on said cap and embedded in the filtering material, horizontal, tubular or pipe-like arms radiating from said pipe and overlying the filtering material and provided on their under sides with perforations, and a steam coil beneath the perforated cap, substantially as described.

4. The combination with, a filter chamber and a pipe communicating with its base of, a perforated cap mounted on the floor of said chamber and over the open end of said pipe, filtering material resting on said cap, and a vertical water pipe mounted on the cap and embedded in the filtering material and radially perforated, substantially as described.

In testimony whereof I have hereunto signed my name.

PETER N. BROOKS.

Witnesses:
A. B. STOUGHTON,
K. M. GILLIGAN.